(12) United States Patent
Tomita et al.

(10) Patent No.: US 6,667,265 B1
(45) Date of Patent: Dec. 23, 2003

(54) ZEOLITE COMPOSITE FILM AND PROCESS FOR PRODUCING THE SAME

(75) Inventors: Toshihiro Tomita, Nagoya (JP); Kunio Nakayama, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/806,682

(22) PCT Filed: Oct. 8, 1999

(86) PCT No.: PCT/JP99/05575

§ 371 (c)(1),
(2), (4) Date: Apr. 3, 2001

(87) PCT Pub. No.: WO00/23378

PCT Pub. Date: Apr. 27, 2000

(30) Foreign Application Priority Data

Oct. 20, 1998 (JP) .......................................... 10-316898

(51) Int. Cl.⁷ ............................. B01J 29/06; B01J 35/02
(52) U.S. Cl. ................ 502/4; 502/60; 502/64; 502/71; 502/77
(58) Field of Search ................ 502/4, 60, 64, 502/71, 77

(56) References Cited

U.S. PATENT DOCUMENTS

| 5,591,345 | A | | 1/1997 | Engelen et al. | |
|---|---|---|---|---|---|
| 5,895,769 | A | * | 4/1999 | Lai | 502/4 |
| 6,037,292 | A | * | 3/2000 | Lai et al. | 502/4 |
| 6,090,289 | A | | 7/2000 | Verduijn et al. | |
| 6,140,263 | A | * | 10/2000 | Anstett et al. | 502/4 |
| 6,177,373 | B1 | * | 1/2001 | Sterte et al. | 502/4 |

FOREIGN PATENT DOCUMENTS

| JP | 9-173799 | | 7/1997 |
|---|---|---|---|
| JP | 10-36113 | | 2/1998 |
| JP | 10-36114 | * | 2/1998 |
| JP | 10-57784 | | 3/1998 |

* cited by examiner

Primary Examiner—Tom Dunn
Assistant Examiner—Christina Ildebrando
(74) Attorney, Agent, or Firm—Burr & Brown

(57) ABSTRACT

A method for producing a zeolite composite membrane in which a zeolite membrane is formed on a porous substrate includes the steps of: coating a zeolite membrane on a porous substrate made of zeolite having the same or a similar composition as the zeolite membrane and containing the same template as the zeolite membrane; and calcining the porous substrate having the zeolite membrane thereon to remove the template from the zeolite membrane and the porous substrate at once. A zeolite composite membrane that does not have cracks can be obtained by almost equalizing thermal expansion coefficients of the porous substrate and the zeolite membrane.

6 Claims, 5 Drawing Sheets

US 6,667,265 B1

ZEOLITE COMPOSITE FILM AND PROCESS FOR PRODUCING THE SAME

TECHNICAL FIELD

The present Invention relates to a zeolite composite membrane and a method for producing the zeolite composite membrane, and more specifically, a zeolite composite membrane having a zeolite membrane without cracks formed on a substrate and a method for producing the zeolite composite membrane.

BACKGROUND ART

There has been hitherto known a zeolite composite membrane having a zeolite membrane formed on a surface of a substrate. In addition, various methods for producing such a zeolite composite membrane have been proposed.

Japanese Patent Laid-Open 59-213615 discloses a substrate for a zeolite membrane in which a substrate of metal or the like is covered with ceramics of glass, mullite, and cordierite type, or alumina, silica, or minerals.

Japanese Patent Laid-Open 60-28826 discloses a composite membrane in which a thin membrane made of cage-shaped zeolite is united with a porous support of an inorganic or a high molecular substance on its surface. Good results have been obtained by the use of a support having high compatibility with a gel substance. For example, it is mentioned that a material No. 7930 from Corning Glass Works Co., Ltd., or one generally refired to as Vycor glass is particularly preferable as a support.

Japanese Patent Laid-Open 1-148771 relates to a method for crystallizing zeolite on a surface of a monolithic ceramic support and discloses a monolithic support having an oxide composition containing 45–4 wt % of silica, 8–45 wt % of alumina, and 7–20 wt % of magnesia, specifically, a sintered monolithic support made of cordierite, glass, or glass ceramic.

Japanese Patent Laid-Open 6-32610 relates to a method for producing an A-type or a faujasite-type zeolite membrane and discloses a substrate made of a substance containing silicon oxide as a main component. The method aims to improve bad adhesion to a substrate. A substrate itself is made of a material of a zeolite membrane in the method, and a surface of the substrate is covered with a zeolite membrane. Therefore, synthesis and impregnation can simultaneously proceed, and processes are simplified. Examples of a material of the substrate are borosilicate glass, quartz glass, silica alumina, and mullite.

Japanese Patent Laid-Open 9-173799 relates to a method for forming a loaded zeolite membrane and the membrane and discloses a substrate made of a ceramic substance basically containing alumina, zirconia, or titanium oxide; an inorganic, an organic, or a mixed substance selected from the group consisting of metal, carbon, silica, zeolite, clay and polymer.

Thus, zeolite composite membranes having a zeolite membrane on a surface of a substrate has conventionally been known. However, it has been found that these composite membranes have the following problem:

That is, as shown in FIG. 3, zeolite shows very complex characteristics in that zeolite has a very small thermal expansion coefficient at a temperature up to about 200° C. and a negative coefficient at a higher temperature. Therefore, when a zeolite membrane is used at a temperature over 200° C., difference in thermal expansion coefficient between the zeolite membrane and a substrate, for example, an alumina substrate extremely increases, thereby causing a crack in the zeolite membrane by a thermal stress.

Depending on kind of a zeolite membrane, it is required to add a template or a crystal directing agent upon synthesis. A zeolite membrane containing a template is subjected to calcination at about 500° C. to remove the template. Since thermal expansion behavior of a zeolite membrane containing a template is remarkably different from that of a zeolite membrane containing no template (thermal expansion curve in FIG. 3 and thermal expansion curve in FIG. 4), a difference in thermal expansion between a zeolite membrane containing a template and a substrate, for example, an alumina substrate is extremely large, thereby causing a crack in the zeolite membrane due to thermal stress during calcination.

The present invention has been made in view of the conventional problems and alms to provide a zeolite composite membrane without any cracks by using a substrate having the same or a similar composition as a zeolite membrane upon forming a zeolite membrane on a surface of the substrate to almost equalize thermal expansion coefficients of the substrate and the zeolite membrane and a method for producing the zeolite composite membrane.

SUMMARY OF INVENTION

According to the present invention, there is provided a zeolite composite membrane comprising:
 a zeolite membrane, and
 a porous substrate made of a zeolite having the same or a similar composition as said zeolite membrane;
wherein said zeolite membrane is formed on said porous substrate.

According to the present invention, there is further provided a zeolite composite membrane intermediate comprising:
 a zeolite membrane containing a template, and
 a porous substrate made of zeolite having the same or a similar composition as said zeolite membrane and containing the same template as said zeolite membrane;
wherein said zeolite membrane is formed on said porous substrate.

DETAILED DESCRIPTION OF THE INVENTION

Figure 3:
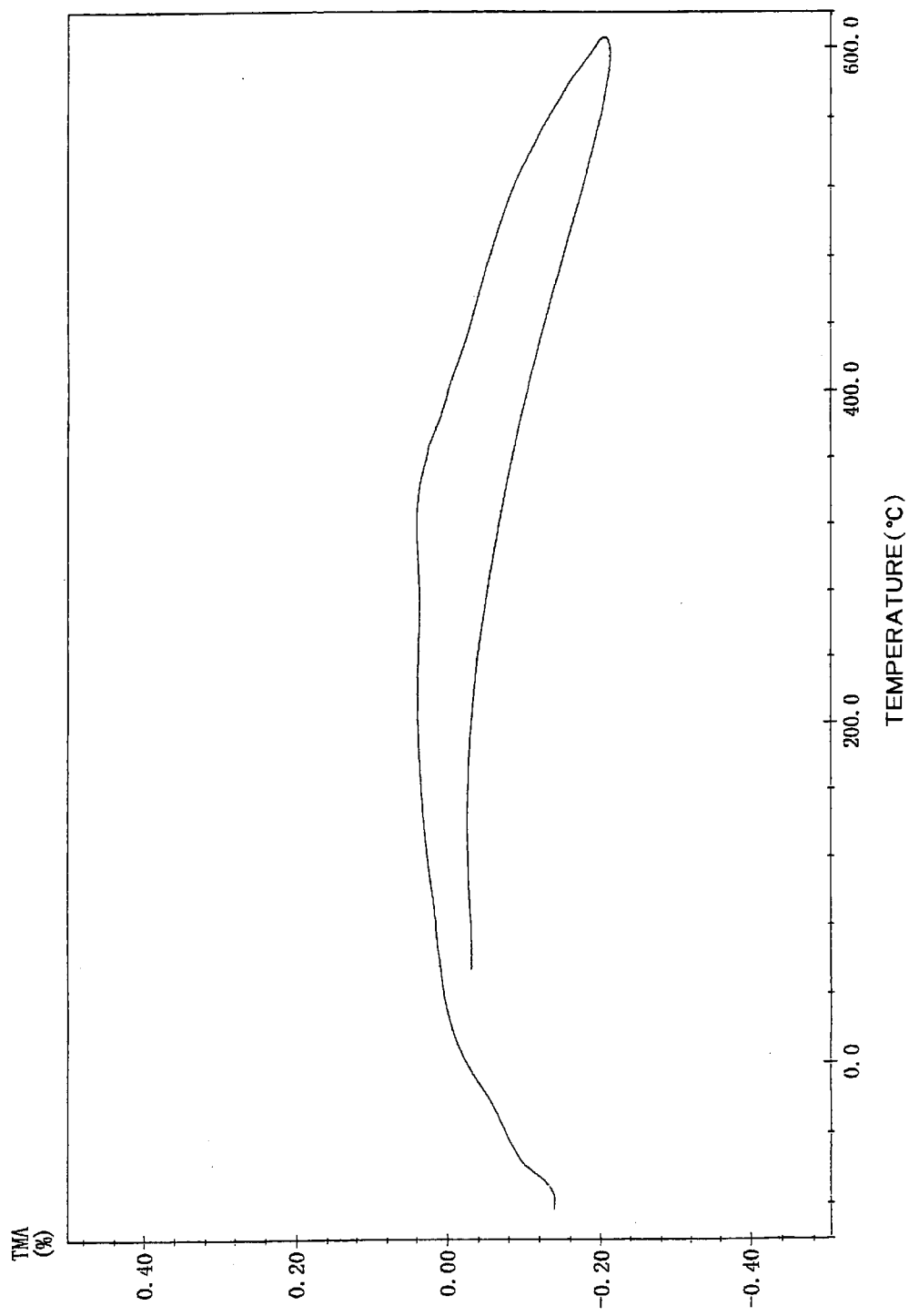
FIG. 3 is a graph showing a thermal expansion curve of MFI-type zeolite.
Figure 4:
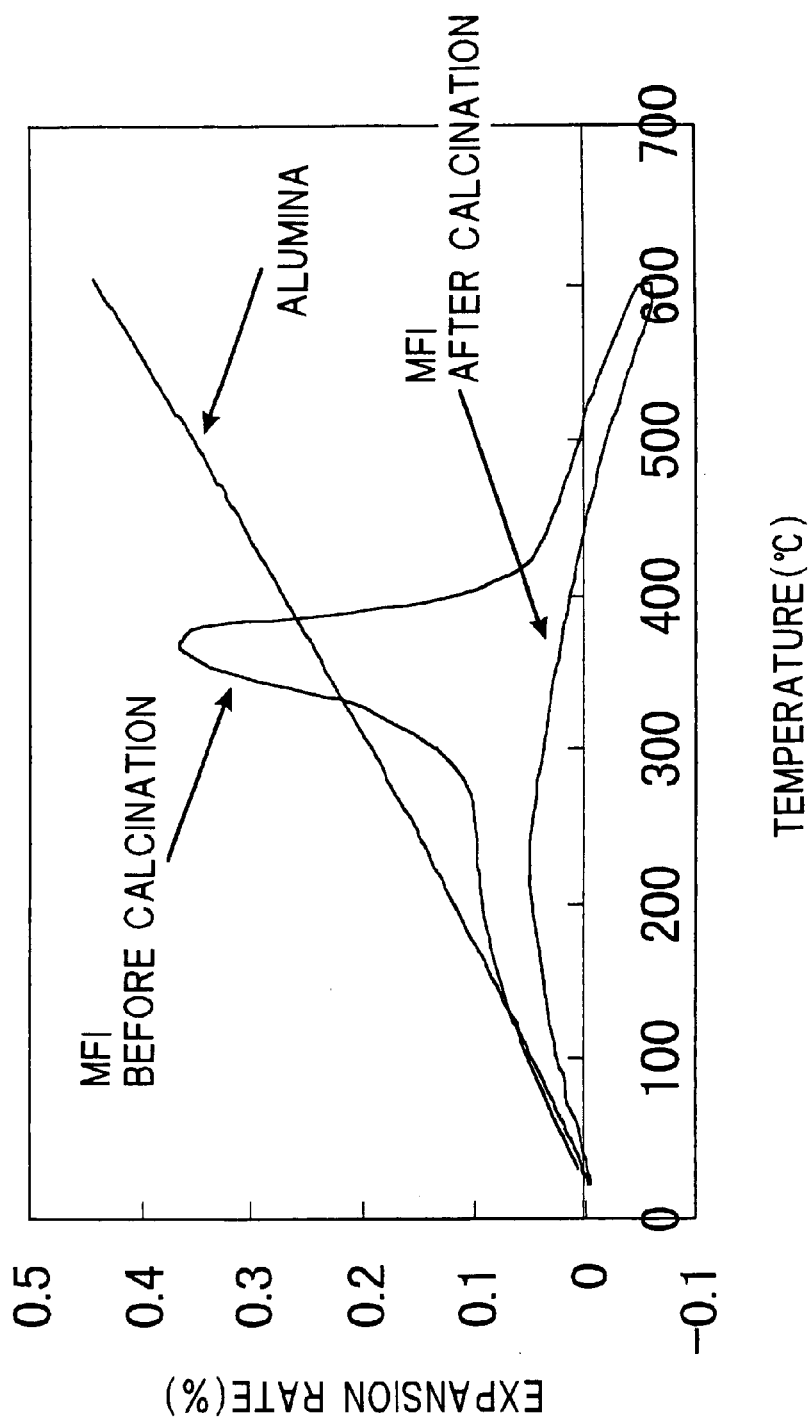
FIG. 4 is a graph showing a thermal expansion curve of MFI-type zeolite and alumina.

The present invention has been accomplished on the basis of finding that thermal expansion behavior of a zeolite membrane containing a template is extremely different from a zeolite membrane containing no template as shown in FIGS. 3 and 4.

That is, a thermal expansion difference upon calcining at about 500° C. to remove a template cannot be solved only by producing a zeolite composite membrane using a substrate having a thermal expansion coefficient close to that of the zeolite membrane, and a crack is caused in the zeolite membrane. Therefore, in the present invention, there are used a zeolite membrane containing a template and a porous substrate made of zeolite having the same or a similar composition as the zeolite membrane and containing the same casting agent as the zeolite membrane.

The present invention is hereinbelow described in more detail.

A zeolite composite membrane of the present invention includes a zeolite membrane and a porous substrate having the same or a similar composition as the zeolite membrane.

As zeolites showing a non-liner extraordinary behavior of thermal expansion, there are known MFI, DOH, DDR, MTN, and AFI (refer ParkS. H. Etal. Stud. Surf. Sci. Catal. 1997, 105, 1989–1994).

As a zeolite membrane requiring a template, there are hydroxide or bromide of TPA (tetrapropyl ammonium) for a MFI-type, hydroxide or bromide of TEA (tetraethyl ammonium) for a BEA-type, or the like, Thermal expansion behavior extraordinary differs between a zeolite membrane containing a template and a zeolite membrane containing no template as shown in FIGS. 3 and 4.

Therefore, in the present invention, when a zeolite membrane containing a template is coated on a porous substrate, a porous substrate containing the same template and made of zeolite having the same or a similar composition as the zeolite membrane is used. On the other hand, when a zeolite membrane containing no template, a porous substrate containing no template and made of zeolite having the same or a similar composition as the zeolite membrane is used.

As a method for producing the zeolite membrane for coating the porous substrate, there may be employed a conventionally known method, for example, hydrothermal synthesis and vapor-phase transport.

That is any of the following methods may be employed:
(1) A method in which a zeolite powder is formed with a binder;
(2) A method in which a zeolite powder is formed with a binder, and the binder is transformed into a zeolite by a chemical treatment;
(3) A method in which a zeolite precursor is molded and then transformed into a zeolite by a heat treatment.

Examples of the above binder-addition method (1) are a method in which a sol such as a silica sol is added to zeolite (Japanese Patent Laid-Open 2-4445), and a method in which an attapulgite-type clay and carboxyl methyl cellulose are added to zeolite (Japanese Patent Laid-Open 10-81511).

Examples of the above binderless method (2) are a method in which kaolin is added to and mixed with zeolite, fired, and subjected to a hydrothermal treatment to transform caolin into zeolite (Japanese Patent Laid-Open 10-101326), and a method in which methakaolin is mixed with zeolite and subjected to an alkali treatment to transform methakaolin into zeolite (Japanese Patent Laid-Open 52-103391).

Examples of the above zeolite solid-phase synthesis method (3) are a method in which template (a casting agent) is mixed with kanemite to obtain an amorphous silicate powder and subjected the amorphous silicate powder to molding and a heat treatment to obtain zeolite such as MFI (Patent No. 2725720), and a method in which a mixture of TEOS and template is subjected to hydrolysis and drying to obtain an amorphous silicate powder, and the powder is subjected to molding and a heat treatment to obtain zeolite (Shimizu, S., Kiyozumi Y. & Mizukami F. Chem. Lett., 1996, 403–404).

Since a crack formed in a zeolite due to a difference in thermal expansion at a molecular level of about 8–50 Å, it cannot be detected even by SEM. Therefore, the following methods are employed in the present invention as a method for measuring the aforementioned crack.

As the first method, a crack made visible by dropping Rhodamine B on the zeolite membrane is observed with an optical microscope.

Figure 5:
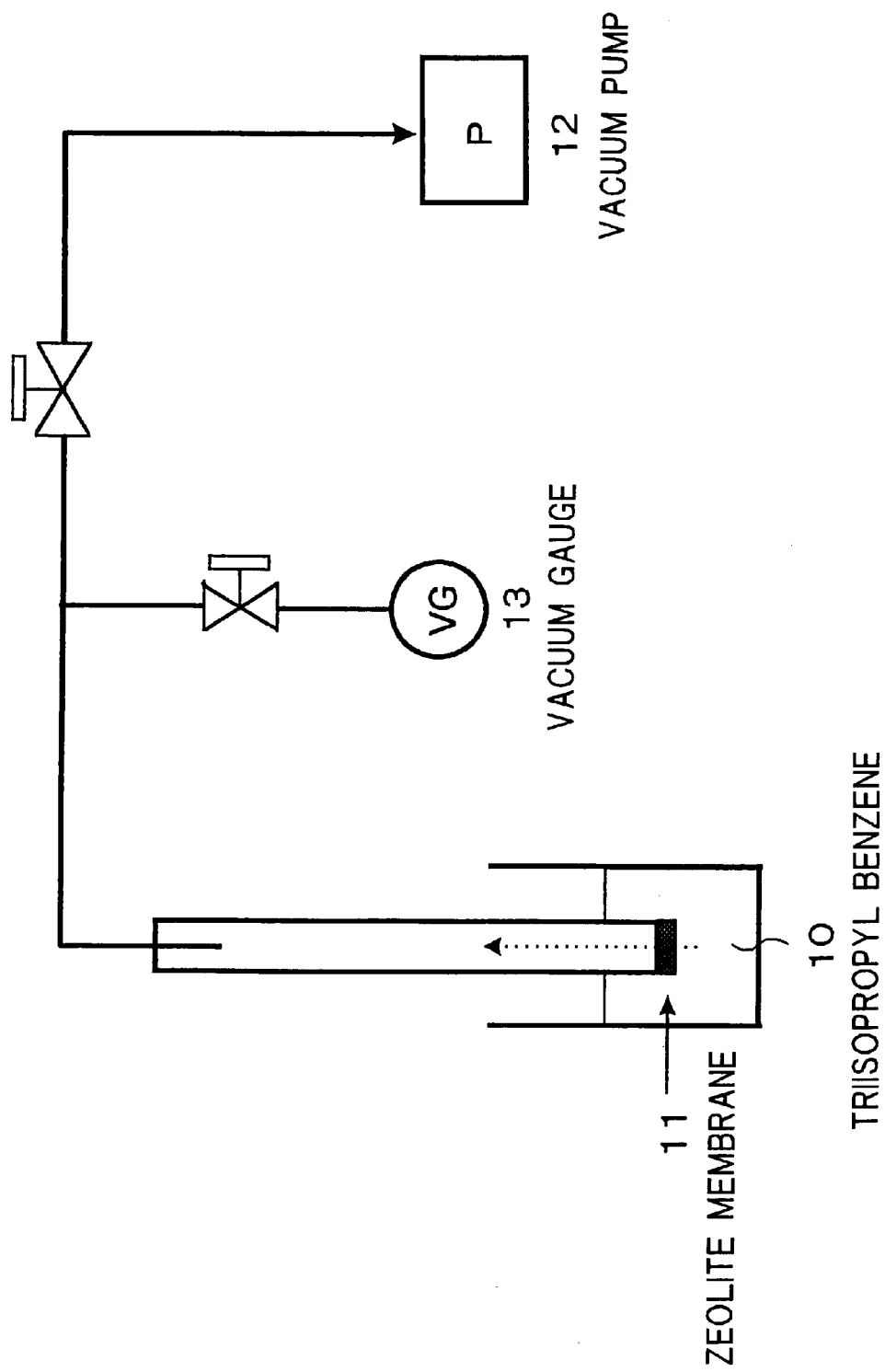
FIG. 5 is a schematic view shown a method for measuring a crack by pervaporation.

The second method is a pervaporation, wherein the tri-isopropyl benzene (TIPB) molecule 10 is sucked by a vacuum pump 12 to make the molecule 10 pass the zeolite membrane 11, as shown in FIG. 5, to confirm presence and absence of a crack by a vacuum gauge 13 or a gas chromatograph.

The present invention is concretely described with reference to examples. However, the present invention is by no means limited to these examples.

EXAMPLE 1

20.00 g of about 30 wt % of silica sol (Snowtex S produced by Nissan Chemical, Industries, Ltd.) and 20.34 g of tetrapropyl ammonium hydroxide solution (produced by Wako Pure Chemical Industries, Ltd.) was stirred in a 200 ml Teflon beaker by a magnetic stirrer for 30 minutes at room temperature to obtain a mixture. The mixture was heated at 80° C., and the stirring was continued until water is evaporated and an evaporated water no longer condenses to the surface of a wall to obtain colorless dried gel. On investigation, a crystal structure of the obtained dried gel was noncrystalline.

This dried gel was ground by an agate mortar, and powder particles passed through a 355 μm-mesh screen was subjected to one-axis press to obtain a molded body having a thickness of 2–3 mm. The molded body was disposed on filter paper in a stainless 100 ml pressure container having a Teflon inner cylinder containing 0.3 ml of distilled water so that the molded body does not contact water and reacted under spontaneous vapor pressure for 16 hours in an oven at a temperature of 130° C. Then, the molded body was subjected to X-ray diffraction, its component was MFI zeolite. The molded body was sufficiently dried at 80° C. to obtain a zeolite substrate.

20.34 g of 10% tetrapropyl ammonium hydroxide solution (produced by Wako Pure Chemical Industries, Ltd.) was mixed with 2.00 g of tetrapropyl ammonium bromide (produced by Wako Pure Chemical Industries, Ltd.) to obtain a mixture. Further, 49.85 g of distilled water, 6.00 g of about 30wt % of silica sol (Snowtex S produced by Nissan Chemical Industries, Ltd.) was added to the mixture, and the mixture was stirred with a magnetic stirrer for 30 minutes at room temperature to obtain sol for forming a membrane.

Figure 1:
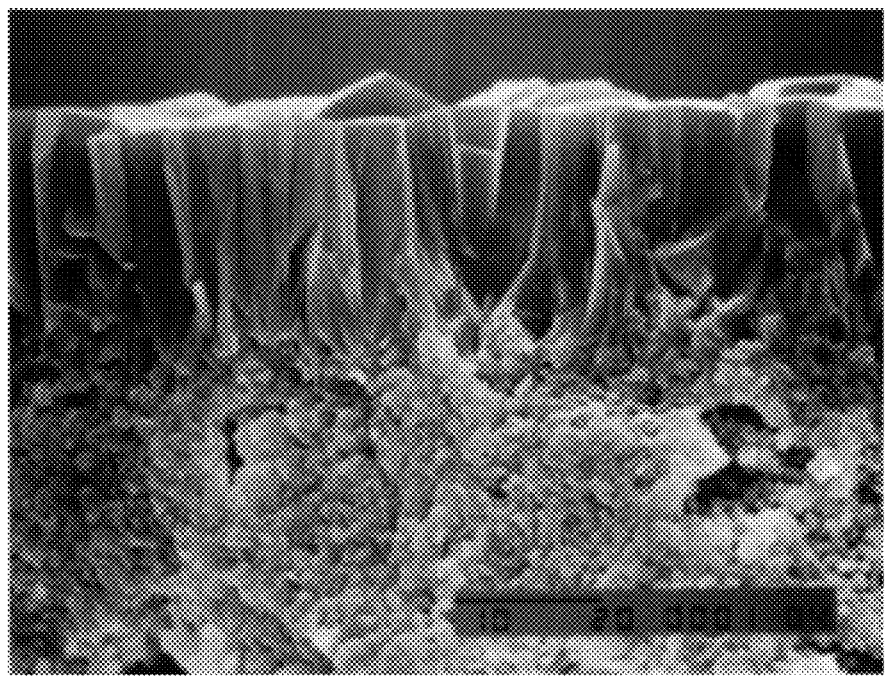
FIG. 1 is a photograph showing a structure of particles in a cross section of a zeolite compound membrane obtained in Example 1.
Figure 2:
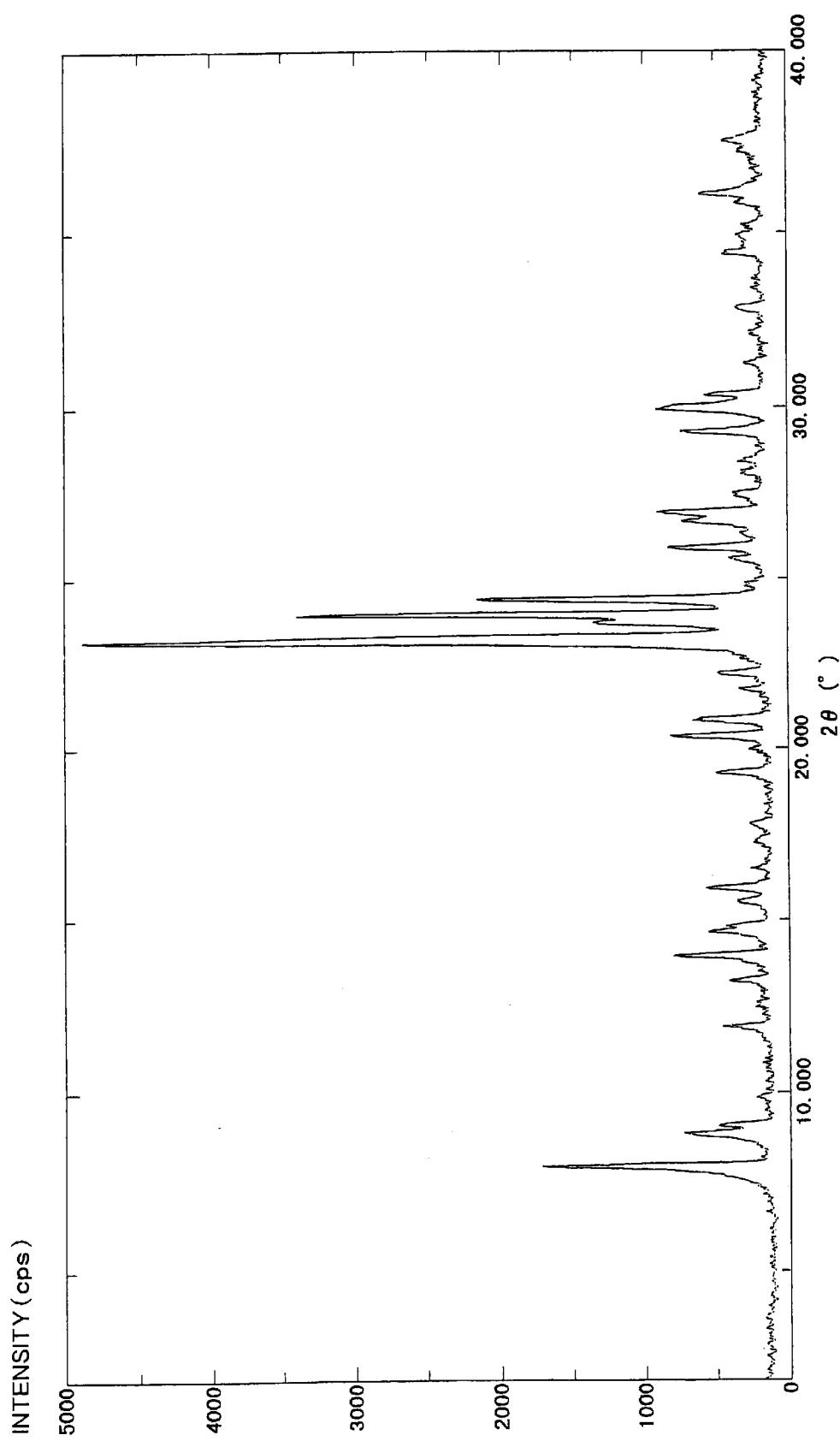
FIG. 2 is a graph showing a result of X-ray diffraction showing a MFI-type zeolite membrane.

This sol was put in a pressure stainless 100 ml pressure container having a Teflon inner cylinder, the zeolite substrate was immersed in the sol, and the sol was subjected to a reaction for 18 hours in an oven at 180° C. A cross-section after the completion of the reaction was observed by scanning electron microscope (SEM), and it was found that a minute layer having a thickness of about 17 μm was formed on the porous zeolite substrate as shown in a scanning electron microscope (SEM) photograph of FIG. 1 and that this minute layer was a MFI-type zeolite membrane from X-ray diffraction as shown in FIG. 2.

A zeolite composite membrane intermediate obtained above was heated up to 500° C. in an electric furnace, and it was kept for 4 hours to remove tetrapropyl ammonium. As shown in FIG. 1, no crack was observed in the zeolite composite by Rhodamine test. In addition, no molecule passed by a pervaporation of triethylbenzene, and it was found that the zeolite composite membrane was minute with no crack.

EXAMPLE 2

A dry gel molded body was disposed on filter paper in a stainless 100 ml pressure container having a Teflon inner cylinder containing 0.3 ml of distilled water so that the molded body does not contact water and reacted under spontaneous vapor pressure for 4 hours in an oven at a temperature of 130° C. Then, the molded body was subjected to X-ray diffraction, its component was MFI zeolite. The molded body was sufficiently dried at 80° C. to obtain a zeolite substrate.

The substrate was immersed in the same sol as in Example 1 and put in a stainless 100 ml pressure container having a Teflon inner cylinder reacted for 18 hours in an oven at 180° C. A cross-section after the completion of the reaction was observed by SEM, and it was found that the same minute layer as shown in Example 1 was formed on the porous zeolite substrate and that this minute layer was a MFI-type zeolite membrane from X-ray diffraction. Further, a portion of the substrate, which was noncrystalline before the membrane was formed, was converted into a MFI-type zeolite by a membrane-forming treatment. Thus, a zeolite composite membrane intermediate having a zeolite membrane formed on a zeolite porous substrate was obtained.

A zeolite composite membrane intermediate obtained above was heated up to 500° C. in an electric furnace, and it was kept for 4 hours to remove tetrapropyl ammonium. As shown in FIG. 1, no crack was observed in the zeolite composite by Rhodamine test. In addition, no molecule passed by a pervaporation of triethylbenzene, and it was found that the zeolite composite membrane was minute with no crack.

COMPARATIVE EXAMPLE 1

A zeolite membrane was formed in the same manner by immersing a porous alumina in a sol prepared in the same manner as in Example 1.

This membrane was heated up to 500° C. in an electric furnace, and it was kept for 4 hours to remove tetrapropyl ammonium. As shown in FIG. 1, a crack was observed in the zeolite composite by Rhodamine test. In addition, molecules passed by a pervaporation of triethylbenzene, and it was found that the zeolite composite membrane was not minute.

COMPARATIVE EXAMPLE 2

A zeolite membrane was formed in the same manner by immersing a porous silicon nitride in a sol prepared in the same manner as in Example 1.

This membrane was heated up to 500° C. in an electric furnace, and it was kept for 4 hours to remove tetrapropyl ammonium. As shown in FIG. 1, a crack was observed in the zeolite composite by Rhodamine test. In addition, molecules passed by a pervaporation of triethylbenzene, and it was found that the zeolite composite membrane was not minute.

COMPARATIVE EXAMPLE 3

A zeolite membrane was formed in the same manner by immersing a porous mullite in a sol prepared in the same manner as in Example 1.

This membrane was heated up to 500° C. in an electric furnace, and it was kept for 4 hours to remove tetrapropyl ammonium. As shown in FIG. 1, a crack was observed in the zeolite composite by Rhodamine test. In addition, molecules passed by a pervaporation of triethylbenzene, and it was found that the zeolite composite membrane was not minute.

COMPARATIVE EXAMPLE 4

A zeolite membrane was formed in the same manner by immersing a porous silica glass in a sol prepared in the same manner as in Example 1.

This membrane was heated up to 500° C. in an electric furnace, and it was kept for 4 hours to remove tetrapropyl ammonium. As shown in FIG. 1, a crack was observed in the zeolite composite by Rhodamine test. In addition, molecules passed by a pervaporation of triethylbenzene, and it was found that the zeolite composite membrane was not minute.

COMPARATIVE EXAMPLE 5

A zeolite membrane was formed in the same manner by immersing a porous cordierite in a sol prepared in the same manner as in Example 1.

This membrane was heated up to 500° C. in an electric furnace, and it was kept for 4 hours to remove tetrapropyl ammonium. As shown in FIG. 1, a crack was observed in the zeolite composite by Rhodamine test. In addition, molecules passed by a pervaporation of triethylbenzene, and it was found that the zeolite composite membrane was not minute.

TABLE 1

|  | Crack | TIPB molecule |
| --- | --- | --- |
| Example 1 | None | Blocked |
| Example 2 | None | Blocked |
| Comparative Example 1 | Present | Passed |
| Comparative Example 2 | Present | Passed |
| Comparative Example 3 | Present | Passed |
| Comparative Example 4 | Present | Passed |
| Comparative Example 5 | Present | Passed |

Industrial Applicability

As described above, according to the present invention, there is provided a zeolite composite membrane without any crack by using a substrate having the same or a similar composition as a zeolite membrane upon forming a zeolite membrane on a surface of the substrate to almost equalize thermal expansion coefficients of the substrate and the zeolite membrane.

Such a zeolite composite membrane can suitably be used as a separation membrane for separating substance, an adsorbent, a catalyst in the petrochemical industry, etc.

What is claimed is:

1. A zeolite composite membrane comprising:
   a zeolite membrane having a crystal structure, and
   a porous substrate made of a zeolite having the same crystal structure as said zeolite membrane;
   wherein said zeolite membrane is formed directly on said porous substrate, and said porous substrate is self-supporting.

2. A zeolite composite membrane according to claim 1, wherein said zeolite is one selected from the group consisting of MFI, AFI, DDR, DOH, MTN and BEA.

3. A zeolite composite membrane intermediate comprising:
   a zeolite membrane having a crystal structure and containing a template, and a porous substrate made of zeolite having the same crystal structure and containing the same template as said zeolite membrane;

wherein said zeolite membrane is formed directly on said porous substrate, and said porous substrate is self-supporting.

4. A zeolite composite membrane intermediate according to claim 3, wherein said zeolite is one selected from the group consisting of MFI, AFI, DDR, DOH, MTN and BEA.

5. A method for producing a zeolite composite membrane in which a zeolite membrane is formed on a porous substrate, comprising the steps of:

coating a zeolite membrane on a porous substrate made of a zeolite having the same crystal structure as said zeolite membrane, said zeolite membrane including a template and said porous substrate containing the same template as said zeolite membrane; and calcining the porous substrate having the zeolite membrane thereon to remove the template from the zeolite membrane and the porous substrate at once, wherein said zeolite membrane is formed directly on said porous substrate, and said porous substrate is self-supporting.

6. A method for producing a zeolite composite membrane according to claim 5, wherein said zeolite is one selected from the group consisting of MFI, AFI, DDR, DOH, MTN and BEA.

* * * * *